United States Patent [19]
Chapman

[11] 3,884,080
[45] May 20, 1975

[54] VACUUM GAGE

[75] Inventor: Ronald Chapman, Orleans, Ontario, Canada

[73] Assignee: Canadian Patents and Development Limited, Ottawa, Ontario, Canada

[22] Filed: Sept. 24, 1973

[21] Appl. No.: 400,567

[52] U.S. Cl. ............................... 73/399; 338/22 R
[51] Int. Cl. ............................................ G01l 21/12
[58] Field of Search ....... 73/399, 398 AR; 338/22 R

[56] References Cited
UNITED STATES PATENTS

| | | | |
|---|---|---|---|
| 2,706,911 | 4/1955 | Strong | 73/399 |
| 3,139,754 | 7/1964 | Dore | 73/398 R |
| 3,368,407 | 2/1968 | Orr, Jr. et al. | 73/399 |
| 3,402,131 | 9/1968 | Futaki et al. | 338/22 R |

*Primary Examiner*—Donald O. Woodiel
*Attorney, Agent, or Firm*—Edward Rymek

[57] ABSTRACT

The sensing element of the vacuum gage comprises a thin film of polyconductive material deposited on an insulating substrate between two metal contacts. It has been determined that if a cyclically varying unidirectional current is applied to the polyconducting material, the average voltage across the device will be directly related to the pressure at the surface of the material in a vacuum.

9 Claims, 6 Drawing Figures

VACUUM GAGE

This invention relates to vacuum gages, and in particular, to a vacuum gage having a sensing element which includes a polyconductive material that exhibits more than one type of electrical conductive state depending on its environmental temperature.

Conventional vacuum gages which include the McLeod Manometer and various thermocouple or thermal conductivity gages have been found to have many drawbacks. Some gages are expensive because of the insensitivity of their sensing heads necessitating high gain amplifier, others because they cannot be easily mass produced or are not interchangeable without recalibration. Other gages are found to have a slow response time or are of limited accuracy.

One gage, which is described in U.S. Pat. No. 3,139,754, "Electronic Vacuum Gauge" issued to B. V. Dore on July 7, 1964 and assigned to Sylvania Electric Products, appears to overcome some of the above disadvantages. It consists of a thin layer of semiconductor material sandwiched between two metal layers. When a unidirectional bias voltage is placed across the device, the magnitude of the current flowing through the device is directly related to ambient pressure. However, the device appears to have a limited range and is relatively insensitive in the upper portion of the range.

It is, therefore, an object of this invention to provide a vacuum gage which operates over a wide range.

A further object of this invention is to provide a vacuum gage which is highly sensitive over its entire range.

Another object of this invention is to provide a vacuum gage which has a fast response time.

A further object of this invention is to provide a small, inexpensive, and reliable vacuum gage.

Another object of this invention is to provide a vacuum gage having a thin film sensing element.

These and other objects are achieved in a vacuum gage which uses polyconductive material in the sensing element in combination with a circuit for applying a cyclically varying unidirectional current to the sensing element and a means for measuring the average voltage across the sensing element to provide a direct reading of the pressure at the surface of the element. The sensing element consists of a layer of polyconductive material deposited on the surface of an insulating substrate, with two spaced contacts in intimate contact with the polyconductive material. Since the polyconductive material exhibits a marked change from one type of electrical conductive state to another at a predetermined temperature, i.e., from metallic to semi-conductor or insulator, the cyclically varying current driven through the sensing element will have a joule heating effect on the element, cyclically driving its temperature above and below the transition temperature. In addition, as the gas pressure in the vacuum system is increased, a greater amount of heat is transferred from the surface of the sensing element by convection, the polyconductive material will therefore remain in the high resistance region for a larger portion of each cycle, thus exhibiting a larger average resistance. The average voltage across the element will also increase and may be measured by a volt meter calibrated in terms of pressure.

Figure 1:
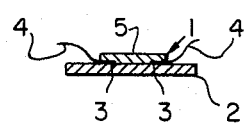
FIG. 1 is a side view of a sensing element in accordance with the invention.
Figure 2:
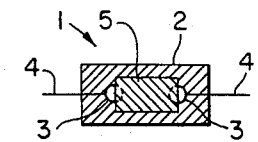
FIG. 2 is a top view of the sensing element.
Figure 3:
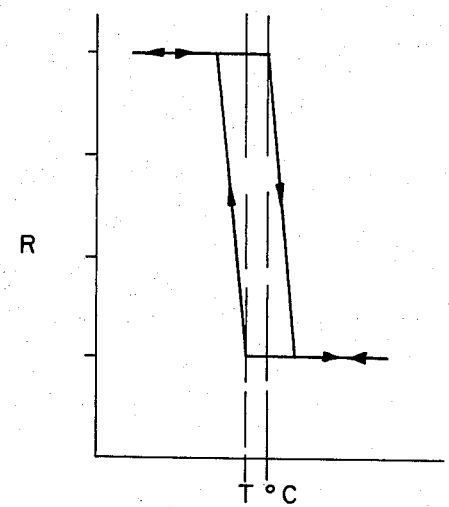
FIG. 3 illustrates a typical R vs T° characteristic curve for polyconductive materials.

The sensing element 1 in the vacuum gage system is illustrated in FIGS. 1 and 2. An insulating substrate 2 is used as the base for the sensing element. It is preferably a low thermal conductivity material such as quartz so as to prevent heat loss from the element 1 through the substrate 2, however, other materials are also suitable. Two spaced metals contacts 3 are bonded to the substrate 2, and sensing element leads 4 are connected, as by welding, to contacts 3. A layer of polyconductive material 5 is deposited on the substrate 2 in such a manner as to be in intimate electrical contact with the contacts 3 to form a bridge between the contacts. The polyconductive material exhibits more than one type of electrical conductive state depending on its environmental temperature, i.e., metal to insulator or semiconductor. FIG. 3 illustrates the typical behavior of the resistivity of a polyconductive material where the material goes from a high resistance to a very low resistance at a transition temperature. It is seen from FIG. 3 that thermal hysteresis occurs, in that a different path is traced depending on whether the temperature is increasing or decreasing. Among the polyconductive materials which have been developed, $VO_2$ is found to be advantageous since its temperature transition is found to be at approximately 68°C. However, $V_3O_5$ with a transition temperature near 150°C is also suitable, and in addition exhibits very little thermal hysteresis. The polyconductor 5 is deposited on the substrate 2 in such a manner as to produce a large surface area with a minimum of mass so as to optimize temperature transfer from the surface of the polyconductor 5 to the environment in the vacuum chamber (not shown). A practical thickness for the polyconductor would be in the range of approximately 500 to 10,000 angstroms.

Figure 4:
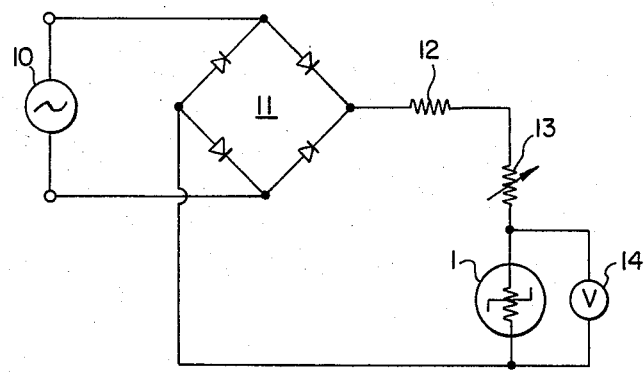
FIG. 4 illustrates a driving circuit in accordance with the invention.

A driving circuit provides the sensing element with a cyclically varying unidirectional current. One practical circuit, illustrated in FIG. 4, includes an a.c. source 10, such as a normal 60 cycle main connected to a full wave rectifier 11. However, other sources with different frequencies or non-sinusoidal waveforms, may also be used. Rectifier 11 is connected in series with a current limiter resistor 12, a current adjust resistor 13 and the sensing element 1. A voltmeter 14 which may be calibrated in microns, averages the voltage across the sensing element 1 for an entire cycle of the cyclically varying current or a fixed portion of the cycle.

Figure 5:
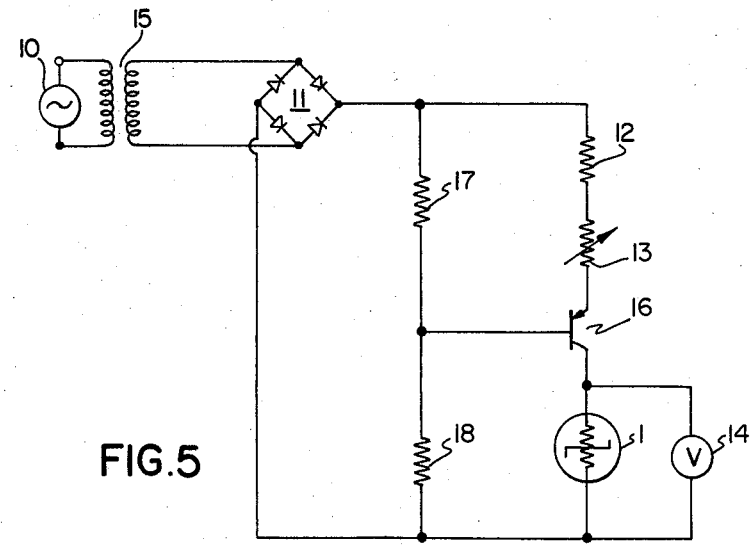
FIG. 5 illustrates a second driving circuit in accordance with the invention.

Another embodiment of the driving circuit is shown in FIG. 5 where like elements are referred to by like reference numbers. The source 10 is connected to the full-wave rectifier 11 through an isolating transformer 15. A transistor 16 is connected in series with the current adjust resistor 13 and the sensing element 1. The transistor is controlled by voltage divider resistors 17 and 18 which are connected across the bridge. The transistor provides a high source impedance in the series circuit. The voltmeter 14, calibrated in terms of pressure in microns, is connected across the sensing element 1.

Figure 6:
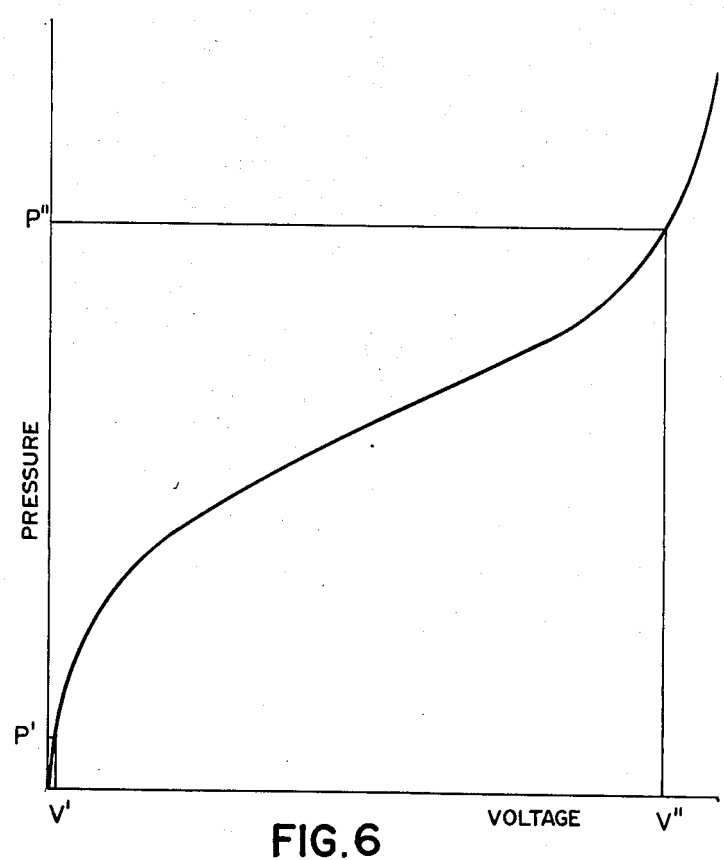
FIG. 6 illustrates the voltage V versus the pressure P of a system in accordance with the invention.

The operation of the novel vacuum gage will be described in conjunction with FIG. 6 which is a typical plot of the average voltage across the sensing element versus the pressure at the surface of the polyconductor sensing element, $v'$ to $v''$ being the useful voltage readings for a pressure range $p' - p''$. When a current is passed through the polyconductive material, joule heating occurs, raising the temperature of the sensing element. This heat is dissipated into the evacuated chamber by convection at a rate which is dependent on the pressure in the chamber. With a cyclically varying current, the polyconductive material is driven back and forth through its transistionregion, resulting in an average resistance which produces an average voltage across the sensing element. This voltage is directly related to the pressure at the surface of the element in the evacuated chamber. It has been found that the vacuum gage may be adjusted so as to provide a high sensitivity over a wide pressure range. As an example, in a gage using a $VO_2$ sensing element provided with a peak rectified sinusoidal current of 1 m.a., the average voltage across the sensing element varied approximately 25 volts for a range of pressures at the surface of the $VO_2$ of 1 to 10,000 microns.

The sensitivity of the device is optimized by current adjust resistor 13. In the example above, the voltage variation will not be as great for the pressure range if the peak current through the device is larger or smaller than 1 m.a. The current at which maximum sensitivity is obtained will be determined by the thickness of the film together with contact spacing and the mass of the device. Other factors such as the type of substrate material may also alter the optimum current.

As described, the invention provides a new thin-film vacuum gage, however, in addition, due to the nature of its construction, it may be incorporated into other gages to extend their useful ranges. Further, the device in a simplified form, could find use as a digital pressure switch.

What is claimed is:

1. A vacuum gage comprising:
   a sensing element having a thin film of polyconductor material of predetermined transition temperature between low and high conductivity states, said film adapted to be exposed to the gas in the vacuum to be measured;
   current means for providing a cyclically varying current through the thin film, to cyclically heat said film above said transition temperature so that the thin film will cyclically switch between its low conductivity state and its high conductivity state;
   means for determining the average resistance of the thin film over at least a predetermined portion of the current cycle, said average resistance indicating the pressure of said gas due to heat transfer from said thin film to the gas.

2. A vacuum gage as claimed in claim 1 wherein said polyconductor material exhibits an abrupt change in resistance as its temperature moves through the transition temperature.

3. A vacuum gage as claimed in claim 2 in which the polyconductor material is $VO_2$.

4. A vacuum gage as claimed in claim 2 in which the polyconductor material is $V_3O_5$.

5. A vacuum gage as claimed in claim 1 in which the sensing element comprises:
   an insulating substrate;
   two spaced metal contacts bonded to the substrate; and
   the film of polyconductor material deposited on the substrate in intimate electrical contact with the spaced contacts.

6. A vacuum gage as claimed in claim 1 in which the resistance determining means includes voltage measuring means connected across the sensing element.

7. A vacuum gage as claimed in claim 1 in which the cyclically varying current is a rectified sinusoidal alternating current.

8. A vacuum gage as claimed in claim 7 in which the current means comprises:
   rectifier means with an input adapted to be connected to a sinusoidal ac source;
   a current limitor resistor; and
   a current adjust resistor, the limitor resistor, the adjust resistor and the sensing element connected as a series circuit coupled across the rectifier output.

9. A vacuum gage as claimed in claim 8 which further includes:
   a transformer connected between the rectifier input and the sinusoidal source;
   first and second resistors connected in series across the rectifier output; and
   transistor means having a collector and an emitter connected in the series circuit and a base connected between the first and the second resistors.

* * * * *